United States Patent [19]

Hannover

[11] 4,027,903

[45] June 7, 1977

[54] WATER-DEGRADABLE COUPLING MEMBER

[75] Inventor: Finn Hannover, Wilmington, Del.

[73] Assignee: E. I. Du Pont de Nemours and Company, Wilmington, Del.

[22] Filed: Feb. 6, 1975

[21] Appl. No.: 547,468

[52] U.S. Cl. .............................. 285/156; 264/221; 285/298; 285/31
[51] Int. Cl.$^2$ ........................................ F16L 41/00
[58] Field of Search ............ 285/31, 156, 298, 150, 285/155, 165, 417, 303, 189; 425/DIG. 12; 244/135; 264/221, DIG. 44, 317; 403/300; 138/97, 105, 108; 249/11, 61, 98, 175, 178, 155

[56] References Cited

UNITED STATES PATENTS

| 259,457 | 6/1882 | Armington | 285/302 X |
|---|---|---|---|
| 827,223 | 7/1906 | Firey | 425/DIG. 12 |
| 2,409,865 | 10/1946 | Jewell | 285/22 |
| 2,711,001 | 6/1955 | Wormer | 425/DIG. 12 |
| 2,765,511 | 10/1956 | Greene | 264/317 |
| 2,794,233 | 6/1957 | Morton et al. | 264/31 |
| 3,401,505 | 9/1968 | Bollard | 285/303 X |
| 3,888,662 | 6/1975 | Boeckeler | 264/317 |

*Primary Examiner*—Dave W. Arola

[57] ABSTRACT

A core element preferably of plastic material is provided wherein one embodiment of the core element comprises (1) a tubular body member and (2) a tubular coupling member of water-degradable material disposed within one end of the tubular body member and extending axially outwardly therefrom, and (3) a tubular coupling member of water-degradable material disposed within the other end of the tubular body member and also extending axially outwardly therefrom, including also diametrically opposed lug members extending radially outwardly from the tubular coupling member that engage a slot disposed in the wall of the tubular body member whereby the tubular coupling member may be moved into and out from the tubular body member as in a telescoping manner.

6 Claims, 4 Drawing Figures

WATER-DEGRADABLE COUPLING MEMBER

FIELD OF THE INVENTION

The present invention relates to an article of manufacture and, more particularly, is directed to a core element for use in casting a lateral connection between a branch pipe and a main pipe.

BACKGROUND OF THE INVENTION

Shaped structures such as pipe and pipe fittings of organic polymeric material such as polyethylene have become widely known and used for diverse purposes such as for conveying fluids. Piping systems of organic polymeric material have been found to be desirable especially in view of the ease with which such systems may be fabricated. For example, pipe fittings and pipe may easily be assembled together by utilizing chemical solvents, adhesives or heating treatments for joining these pieces, e.g., polyethylene pipe fittings may be joined to polyethylene pipe by heating the fitting and the pipe before assembly to melt the polyethylene at the region or surface of each piece to be contacted followed by mating the heated surfaces of each piece and cooling the heated pieces whereby to effect fusing of the polyethylene to provide a structure of integral or unitary construction. Such pipe and pipe fittings have been found to be especially useful in relining sewer mains.

Existing sewer mains of, for example, concrete, clay, or cast iron pipe, often become unserviceable because a pipe section either decays or is physically damaged as by breaking due to dynamic earth stresses acting thereon. Rehabilitating unserviceable sewers by replacing defective sewer components is extremely difficult and expensive. These drawbacks can be minimized or avoided by inserting polyethylene pipe into existing sewer mains. This is easily accomplished by effecting only a few excavations at widely spaced ponts along a sewer main and penetrating the main at these points and inserting thereinto a continuous length of polyethylene pipe. These lengths of polyethylene pipe may be connected at their respective ends by conventional fusing techniques to provide a continuous pipe encompassed within the existing sewer main. A method and apparatus for relining sewer pipe are disclosed in, for example, U.S. Pat. No. 3,602,263.

Joining a branch service line to the continuous plastic pipe inserted in the sewer main presents a difficult problem. It is often necessary, and sometimes unavoidable, to destroy and remove a section of the branch line in order to provide a means of access for penetrating through the wall of the continuous plastic pipe in the sewer main which is necessary for connecting the branch line to the renewed sewer main. The foregoing does, however, require replacement sections of the branch line which usually entails extensive, expensive and undesirable excavation work in often crowded locations such as public thoroughfares which leads to undesirable public inconvenience. Accordingly, the object of the present invention is to provide a core element suitable for readily and easily joining a branch line to a plastic pipe in a sewer main.

THE INVENTION

According to the present invention there is provided an article of manufacture comprising a core element of water degradable material for casting a lateral connection between a branch pipe and a main pipe of larger diameter than said branch pipe, said core element having an elongated hollow body portion of substantially uniform wall thickness adapted to be connected at one end to said branch pipe and inserted at the other end into an opening in the wall of said main pipe, whereby said core element is adapted to be encapsulated by a castable compound and to degrade after hardening of the castable compound by means of water flowing from said branch pipe to said main pipe.

One embodiment of the core element of the invention for joining a lateral branch pipe to a main pipe through an opening in the wall of the main pipe comprises a tubular body member; a first tubular coupling member of water-degradable material disposed within one end of said tubular body member and extending outwardly therefrom in substantially coaxial relation therewith; a second tubular coupling member of water-degradable material disposed within the other end of said tubular body member, including stop means projecting radially outwardly from said second tubular coupling member and adapted to co-operatively engage guide means in said tubular body member for slidable axial movement of said second tubular coupling member within said tubular body member, whereby one of said tubular coupling members is adapted to be inserted into the end of said lateral pipe and the other tubular coupling member is adapted to be inserted into the opening in the wall of said main pipe thereby to connect said lateral pipe to said main pipe. In a preferred embodiment, both the first and second tubular coupling members of the core element are fabricated of, polyvinyl alcohol or paper.

DETAILED DESCRIPTION

The nature and advantages of the core element of the present invention will be more readily understood by the following description and the several views illustrated in the accompanying drawings wherein like reference characters refer to the same parts throughout the several views and in which.

Figure 1:
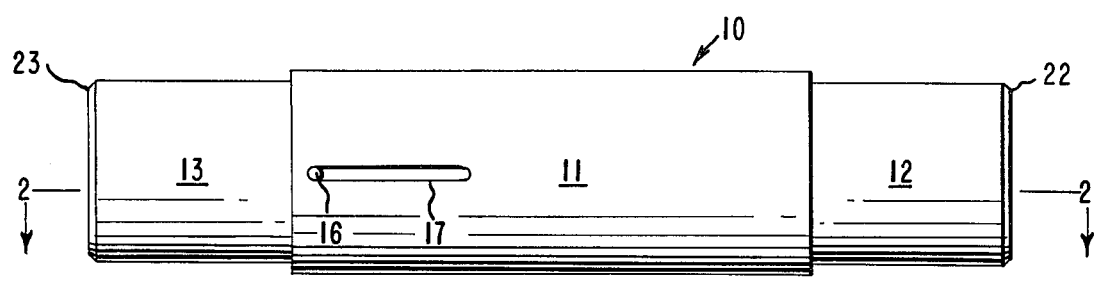
FIG. 1 is an elevation view of one embodiment of the core element of the invention.
Figure 2:
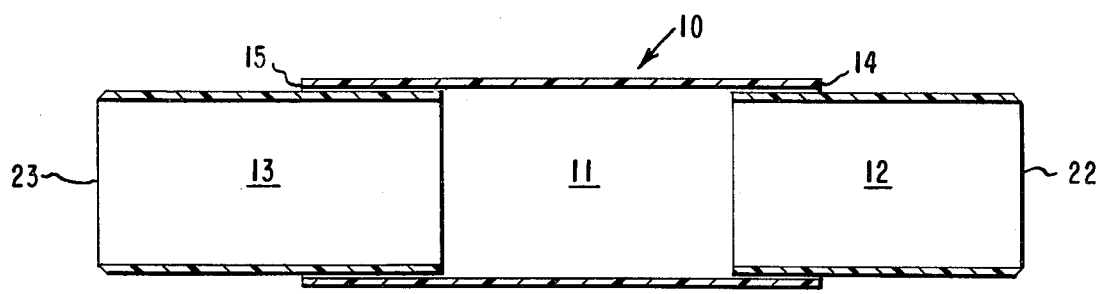
FIG. 2 is a cross-sectional view along line 2—2 of the core element of FIG. 1.

One embodiment of the core element of the invention is shown in FIGS. 1 and 2. The core element 10 disclosed in illustration of the invention, as depicted in FIG. 1, includes a tubular body member 11 having a tubular coupling member 12 extending axially outwardly from one end thereof and a tubular coupling member 13 extending axially outwardly from the other end thereof.

The construction of core element 10 of the invention is shown in greater detail in FIG. 2 wherein the tubular body member 11 is depicted as having two ends 14 and 15. Tubular coupling member 12 is disposed within tubular body 11 and extends axially outwardly from end 14 thereof. Similarly, tubular coupling member 13 is disposed within tubular body member 11 and extends axially outwardly from end 15 thereof. Tubular coupling member 13 is so constructed and arranged as to telescope into tubular body member 11. The telescoping action of tubular coupling member 13 is provided by the co-operative engagement of lug member 16 that protrudes radially outwardly from the outer surface of tubular coupling member 13 with slot 17 in the wall of tubular body member 11. Two slots such as 17 disposed preferably diametrically opposite each other may be provided in the wall of tubular body member 11. Similarly, two lugs such as 16 disposed preferably diametrically opposite each other may be provided on the outer surface of tubular coupling member 13 for engagement with slots 17. Each slot 17 provides a means for guiding and limiting the travel of lug 16 in engagement therewith and thus the telescoping movement of tubular coupling member 13 within the tubular body member 11.

Figure 3:
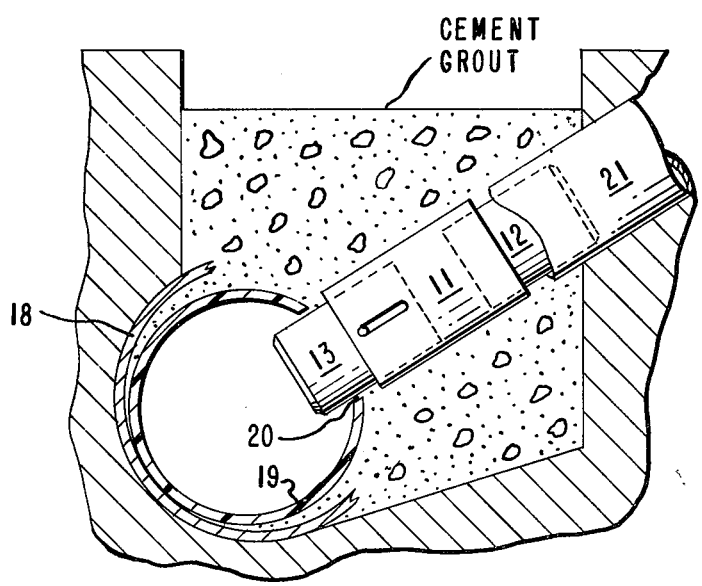
FIG. 3 is a schematic view ilustrating the intended use of the core element of FIG. 1.

The use of core element 10 is illustrated in FIG. 3 which depicts schematically an excavation containing an old sewer main 18 that has been rehabilitated by placing a polyethylene pipe 19 thereinto. An opening 20 is provided at a point or location in the wall of polyethylene pipe 19 approximately opposite the lateral branch pipe 21 that initially had been connected directly to old sewer main 18. In actual practice, the process of rehabilitating an old sewer system entails first placing a polyethylene pipe such as pipe 19 into the old sewer main such as 18, followed by exposing the connection between the lateral branch pipe 21 and the old sewer main 18 and then removing the connection by mechanical means to expose a portion of the polyethylene pipe 19 within old sewer main 18. Thereafter, opening 20 is provided in the wall of polyethylene pipe 19 by any suitable means such as drilling or cutting. Core element 10 of the invention is utilized to connect the lateral branch pipe 21 to the polyethylene pipe 19 in old sewer main 18. This is accomplished by inserting one of the tubular coupling members such as, for example, tubular coupling member 12 of core element 10, into the exposed end of lateral branch pipe 21 while maintaining the other tubular coupling member 13 telescoped within the tubular body member 11 of pipe fitting 10. Thereafter, the other end of core element 10 is aligned with opening 20 in the wall of polyethylene pipe 10 and tubular coupling member 13 is advanced through opening 20 and into polyethylene pipe 19. Next, the installation is completed by passing a suitable castable compound such as cement grout into the excavation to cover completely the connection of the lateral pipe 21 to the main pipe 19 thereby to encapsulate the core element 10. A permanent connection of lateral branch pipe 21 to main pipe 19 is effected upon hardening of the castable compound.

Figure 4:
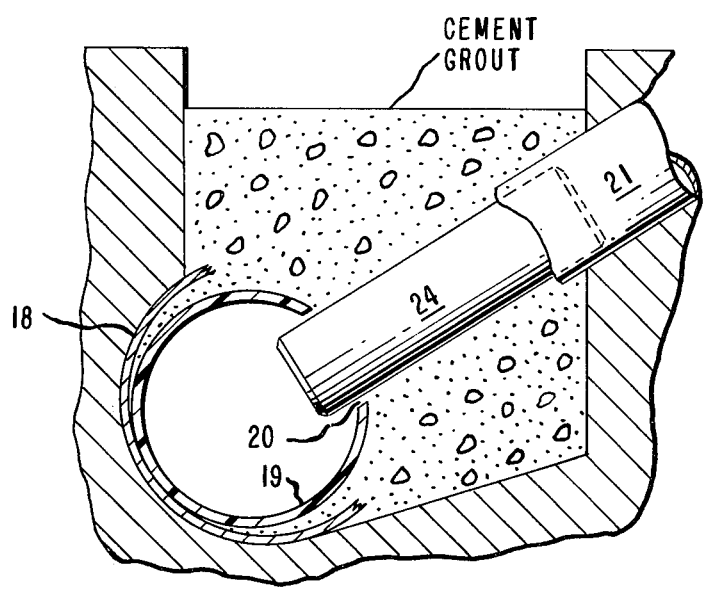
FIG. 4 is a schematic view illustrating the intended use of another embodiment of the core element of the invention.

Another embodiment of the core element of the invention comprises an elongated hollow body such as, for example, a pipe of tubular cross-section preferably of unitary construction having a substantially uniform wall thickness. The core element is of water-degradable material, e.g., polyvinyl alcohol or paper, and is adapted to be connected at one end to a lateral branch pipe. The other end of the core element is adapted to be inserted into an opening in the wall of a main sewer pipe. To illustrate with reference to FIG. 4, one end of the tubular core element 24 is preferably inserted into the exposed end of lateral branch pipe 21 and the other end of the core element is inserted into opening 20 in the wall of polyethylene pipe 19 in sewer main 18.

The salient feature of the core element such as 10 and 24 of the invention is that some or all of the components thereof are made of a water soluble or degradable material such as polyvinyl alcohol that in use will slowly dissolve and flush away with the waste sewage water that flows from lateral branch pipe 21 into main pipe 19, resulting in a smooth, uninterrupted and obstruction-free passage from lateral branch pipe 21 to main pipe 19. For example, tubular core element 24 and tubular coupling members 12 and 13 of core element 10 may be fabricated of polyvinyl alcohol or paper. In each case, the water degradable portions of core element will be dissolved and degraded by the water flowing from lateral branch pipe 21 to main pipe 19 so as to provide an obstruction-free connection between the lateral branch pipe and the main pipe. The foregoing is a very important consideration for the successful and efficient operation of a sewer system.

The tubular body member 11 of core element 10 may be of any suitable material; polyethylene is preferred. Additionally, the respective ends or leading edges such as 22 and 23 of tubular coupling members 12 and 13 may be tapered to facilitate the installation of core element 10 as a connection between lateral branch pipe 21 and main pipe 19. Tubular coupling members 12 and 13 are preferably of identical construction so that lug members 16 engage slot 17 in one instance and contact the end of tubular body member 11 in the other instance in which case lugs 16 support coupling member such as 12 on the end such as 14 of the tubular body member 11 of core element 10.

What is claimed is:

1. A lateral connection between an end of a branch pipe and a wall of a main pipe comprising:
   a branch pipe
   a main pipe spaced apart from the branch pipe, having a diameter greater than the diameter of the branch pipe, and having an opening in the wall aligned with the end of the branch pipe
   a tubular body member disposed between the end of the branch pipe and the opening in the main pipe
   a first tubular coupling member of water-degradable material disposed within one end of said tubular body member and extending outwardly therefrom, in substantially coaxial relation therewith, into the end of the branch pipe
   a second tubular coupling member of water-degradable material disposed within the other end of said tubular body member and extending outwardly therefrom, in substantially coaxial relation therewith, into the opening in the main pipe.

2. The lateral connection of claim 1 wherein at least one of the tubular coupling members includes stop means projecting radially outward and adapted to cooperatively engage guide means in said tubular body member for slidable axial movement of said tubular coupling members within the tubular body member.

3. The lateral connection of claim 1 wherein the tubular coupling members are polyvinyl alcohol.

4. The lateral connection of claim 2 wherein the tubular coupling members are polyvinyl alcohol.

5. A pipe fitting for joining a lateral branch pipe to a main pipe through an opening in the wall of the main pipe comprising:
   a tubular body member
   a first tubular coupling member of water-degradable material disposed within one end of said tubular body member and extending outwardly therefrom in substantially coaxial relation therewith
   a second tubular coupling member of water-degradable material disposed within the other end of said tubular body member, including stop means projecting radially outward from said second tubular coupling member and adapted to co-operatively engage guide means in said tubular body member for slidable axial movement of said second tubular coupling member within said tubular body member, whereby one of said tubular coupling members is adapted to be inserted into the end of said lateral pipe and the other tubular coupling member is adapted to be inserted into the opening in the wall of said main pipe thereby to connect said lateral pipe to said main pipe.

6. The pipe fitting of claim 5 wherein the water-degradable material is polyvinyl alcohol.

* * * * *